United States Patent Office 2,917,479
Patented Dec. 15, 1959

2,917,479
COMPOSITION COMPRISING AN ALPHA OLEFIN AND CETYL BENZENE

Gerrit Wouter Van Raamsdonk and Jan Selman, Amsterdam, Netherlands, assignors to Shell Development Company, New York, N.Y., a corporation of Delaware No Drawing. Application October 28, 1957
Serial No. 692,555

Claims priority, application Netherlands
November 23, 1956

3 Claims. (Cl. 260—33.6)

This invention relates to improved polymer compositions. More particularly, this invention relates to improved compositions of polymers of alpha-olefins, such as ethylene, whereby a product is obtained having improved properties.

It is now well known that polymers of alpha-olefins may be prepared at low temperatures and pressures in the presence of certain catalyst compositions. Such processes are conducted at temperatures ranging from about ambient temperatures to about 120° C. and pressures below 500 p.s.i. The catalysts are designated in the art generally as "Ziegler catalysts" or "low pressure catalysts." Such catalysts are capable of polymerizing alpha-olefins, as ethylene, butene-1, propylene, styrene and other alpha-olefins. The present invention relates to improved composition of polyethylene, polypropylene, polystyrene, and other polymers and copolymers of alpha-olefins prepared by the low pressure methods. As the technology relating to the polymerization of alpha-olefins by the use of the low pressure catalysts is substantially the same, this invention will be described as it relates to the production of certain homopolymers but it will be readily understood that the invention is of general application to the polymerization of alpha-olefins and copolymers thereof using the low pressure catalysts and low pressure methods.

As indicated above, the catalysts which are utilized in the low pressure processes are the so-called "low pressure catalysts." They may be selected from A through C as follows:

(A) The reaction product of (1) a compound of a metal selected from group IV, V, VI and VIII of the periodic table and manganese with (2) a compound of the formula $R_1R_2AlX$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan, thiophenol, carboxylic acid and sulfonic acid, (B) The reaction product of (1) a compound of a metal from groups IV, V, VI and VIII of the periodic table and manganese with (2) a compound selected from the group consisting of aluminum trialkyl, magnesium alkyl, zinc alkyl and Grignard compound, (C) A composition comprising aluminum trichloride, titanium tetrachloride, and aluminum.

Briefly, the low pressure polymerization processes comprise bringing into admixture any of the low pressure catalysts, of the type described above, together with an alpha-olefin as ethylene. If elevated temperatures and pressures are to be employed, then the reaction vessel is equipped with suitable inlets, outlets, pressure gauges, heating and cooling means, and the like. The catalyst compositions are most conveniently prepared by merely mixing the catalyst component, or components, in an inert hydrocarbon solvent. The thus formed catalyst slurry is then added to the polymerization vessel. As it relates to a catalyst composition prepared from say, aluminum diethyl chloride and titanium tetrachloride, the two ingredients may be added separately to a suitable vessel containing an inert hydrocarbon such as pentane, hexane, isobutane, benzene, toluene, and the like. If desired, the components may be mixed in a separate vessel in the presence of the solvent whereupon there is formed a dark precipitate which constitutes the catalyst composition. The dark precipitate, which may range from a brown to a black-like color, may be separated from the hydrocarbon slurry before it is added to the reaction vessel. However, it is advantageous to merely add the hydrocarbon solvent containing the catalyst in slurry directly to the polymerization vessel. After the polymerization is complete the polymerization products are withdrawn from the reaction vesel. The polymerization product comprises a mixture of the polymer, such as polyethylene, hydrocarbon solvent, catalyst, and catalyst remanents. At this stage of the process, the polymer is characterized by a dark color which is attributed to the presence of catalyst residues. Accordingly, it is conventional to wash the polymer with a lower alcohol such as methanol, butanol, or the like, whereupon a reaction occurs whereby the catalyst remanents are solubilized. Thereafter a simple filtration separates the alcoholic solution of the catalyst remanents from the polymer. If desired, a number of processing techniques may be employed in order to decrease the amount of catalyst or remanent which remains in the polymer, Thus, for example, during the washing step with the alcohol elevated temperatures may be employed. If desired certain advantages may be obtained by employing surface-active agents in conjunction with the alcohol wash. The use of small amounts of mineral acid, such as sulfuric acid, in the alcohol may also be employed. If desired, the wash liquid may be an aqueous solution of a mineral acid such as sulfuric acid. In any case, it is difficult to remove all of the catalyst remanents and small amounts usually remain in traces. The quantity of these traces which remain may be analyzed by igniting a given sample of the polymer and determining the ash content thereof. Thereafter, the remanents may be represented by the "ash content."

Polymers thus obtained by the low pressure methods are characterized by their own unique physical properties. These physical properties, as the molecular weight, tensil strength, flexibility, hardness, and the like may be varied in different ways. Thus, for example, the molecular weight may be varied by varying the quantity of the catalyst, the temperature at which the polymer is prepared, and the like. The molecular weight of polymers prepared by the low pressure methods, as polyethylene, is normally characterized by a relatively low molecular weight as indicated by intrinsic viscosity determinations. The low molecular weight polymer has the advantage that it may be favorably worked-up but such molecular weight polymers are also characterized by brittleness which is too great for most applications. While the brittleness may be decreased by producing a higher molecular weight polymer the polymer of higher molecular weight has inferior flow properties thus making the working-up procedures more difficult and troublesome.

It is an object of this invention to provide improved compositions of alpha-olefin polymers produced by the low pressure methods. It is another object of this invention to provide improved polymeric compositions having improved physical properties, the composition being predominently alpha-olefin polymers prepared by the low pressure methods. It is another object of this invention to provide improved compositions of polymeric alpha-olefins having improved flexibility and strength. More particularly it is an object of this invention to provide improved polyethylene composition, the polyethylene being prepared by the low pressure methods, which compositions are characterized by improved physical properties. The other objects will become apparent as the description of the invention proceeds.

These and other objects are accomplished by composition comprising a polymer of an alpha-olefin, prepared by the low pressure method, and an aromatic compound being substantially free of polar groups having at least 5 aromatic carbon atoms, the said aromatic compound being present in an amount ranging from 0.5 to 25 parts by weight of said polymer. The polymeric composition will be found to have improved physical properties as will appear hereinafter more fully from the examples. It will be appreciated that the novel composition of this invention are essentially physical mixtures which are prepared by intimately mixing or blending the polymer of the alpha-olefin and the aromatic compound. The mixing may be accomplished in any suitable manner such as by kneading, milling, and the like.

The aromatic compound employed in the compositions of this invention may be varied greatly depending upon the molecular weight of the polymer, the nature of the polymer and the like. In general, with higher molecular weight polymers a larger proportion of the aromatic compound is required. Accordingly the quantity of the aromatic compound in the composition may range as high as 25% by weight and as little as about 0.5% by weight depending upon the brittleness of the polymer. When the polymer is more brittle larger amounts are required but in general 10% by weight of the polymer is usually sufficient for most purposes. More often, however, amounts ranging from 1 to 5% by weight will be employed.

The compounds which give the improved brittleness and flow properties to the alpha-olefin polymers may be either a cyclic or cyclo-aliphatic compound having at least one cyclic group of at least 5 carbon atoms. The cyclic group preferably contains only carbon but is not limited thereto as other atoms may be contained in the ring. When the compound is a hetero-cyclic compound it is preferable that the hetero atom either be non-polar or if it is polor then it should be present in a relatively small proportion of the total compound. In the preferred embodiment the cyclic compound contains one or more aliphatic chains attached to a cyclic carbon atom. Preferably, such chains contain more than 8 carbon atoms and more preferred are those having more than 12 carbon atoms. If desired the chains may link two cyclic groups. Representative cyclic compounds include cetyl benzene, chlorinated diphenyl, dioctyl phthalate, camphor, isomerized Assam wax (having 8% cyclic compounds) naphthalene, anthracene, bornylene, tropane, and the like. The cyclic compound may also be suitably selected from polymers having cyclic structures within the molecule. A representative copolymer in this category is a copolymer of styrene and butadiene. In the event that a copolymer is employed it should preferably have a molecular weight less than 10,000. Other compounds which may be used but are less preferred include for example pyrrole, thiazole, triazines and other heterocyclic compounds having more than two heterocyclic atoms. In all cases the cyclic compound should be a solid at normal conditions. However, it may be a liquid in which case it is employed in amounts in one order of 0.5 to 1% by weight.

The invention will be illustrated in greater detail in the following examples. It should be understood however that the examples are for purposes of illustration only and are not intended as limitations to the appended claims.

EXAMPLE I

A catalyst suspension in isooctane is formed by mixing titanium tetrachloride and aluminum diethyl chloride, in the proportion of 0.95 part by weight to 0.67 part by weight respectively to 1000 parts of isooctane. The two components are mixed for 20 minutes at 40° C. whereupon slurry forms. Ethylene is then bubbled through the slurry. Introduction of ethylene is discontinued after three hours. To the slurry thus obtained is added 100 cc. of methanol and the contents of the reactor are agitated for several minutes. Thereafter the contents of the vessel are filtered and the polymer is washed with water followed by a washing with methanol and then dried at 50° C. The resulting polymer is then mixed with various amounts of aromatic compounds and the physical properties determined. The results are shown in Table I. The flexibility is determined by bending a polyethylene strip at a rate of 200 double bends per minute through an angle of 312° until it breaks. The strip is 70 mm. long and 5 mm. wide and 0.5–0.6 mm. thick. The hardness is determined according to "British Standard 903:1950."

Table I

| Compound Added | Amount, phr of Polymer | Density, at 25° C, g./ml. | Flexibility | Impact Strength, kg./sq.cm. | Melt Index, g./10 min. | Hardness |
|---|---|---|---|---|---|---|
|  |  | 0.948 | 1,775 | 11.6 | 0.44 | 4.3 |
| Cetyl benzene | 1 | 0.947 | 2,055 | 13.3 | 0.47 | 4.2 |
| Do | 2½ | 0.946 | 2,220 | 15.0 | 0.51 | 5.0 |
| Do | 5 | 0.943 | 3,145 | 16.4 | 0.57 | 4.6 |
| Dioctyl phthalate | 2½ | 0.949 | 2,690 | 14.7 | 0.52 | 4.2 |
| Assam-wax | 5 | 0.942 | 2,571 | 16.7 | 0.56 | 4.5 |
| Camphor | 5 |  | 1,820 | 14.8 | 0.49 | 4.0 |
| Arochlor 1254 [1] | 5 | 0.966 | 2,340 | 18.5 | 0.51 | 4.0 |
| Do | 10 | 0.983 | 2,990 | 24.6 | 0.62 | 4.7 |
| Camphor-Arochlor 1254 1:1, by wt | 5 |  | 3,100 | 17.4 | 0.50 | 4.2 |

[1] Chlorinated diphenyl.

EXAMPLE II

Polyethylene, prepared as in a similar manner as in Example I but having different molecular weights, as indicated by intrinsic viscosity determinations at 120° C. in tetralin, is tested using varying amounts of cetyl benzene. The impact strength and the flow properties are then tested. The flow properties are measured at a pressure of 70 kg./sq. cm. and is expressed in grams per minute on a cross section of 1 mm. capillary of 1 cm. length at a temperature of 200° C. The results are shown in Table II.

Table II

| I. V. of Polyethylene | Quantity of Cetyl Benzene, phr of Polyethylene | Izod Impact kg. cm./sq. cm. | Flowing Properties |
|---|---|---|---|
|  | 0 | 7.2 | 0.54 |
|  | 1 | 8.3 |  |
| 2.8 | 2½ | 8.8 | 0.70 |
|  | 5 | 10.0 |  |
|  | 0 | 5.0 |  |
| 1.9 | 2½ | 7.7 |  |
|  | 0 | 8.8 | 0.69 |
| 2.0 | 2½ | 14.4 | 1.1 |
|  | 0 | 12.1 |  |
| 3.3 | 2½ | 14.4 |  |
|  | 0 | 11.5 |  |
| 4.0 | 2½ | 13.2 |  |
|  | 0 | 5.5 |  |
| 1.6 | 2½ | 7.7 |  |

Similar improvements in the same properties of polypropylene, prepared by the low pressure methods, are observed.

In a series of tests, heterocyclic compounds as pyrrole, thiazole and other heterocyclic compounds are found to improve impact strength, flexibility and flow properties but they are less effective than those cyclic compounds which are free of heterocyclic atoms.

From the foregoing it will be understood that the present invention does not depend on any particular processing technique that may be employed during the preparation of the low pressure polymerization of the alpha-olefin. Thus, other low pressure catalysts of the type previously described may be employed. If desired other conditions of temperature and pressure may be used as well as solid carriers to support the catalyst. It will be further understood that the novel composition of this invention may contain varied amounts of other ingredients which serve a particular function. Thus, for example, dyes and pigment may be incorporated in the novel composition. Antioxidants, fillers, extenders, and the like may also be incorporated in the compositions. Still other modifications may be adopted without departing from the spirit of the invention.

We claim as our invention:

1. A composition comprising a linear polymer of an alpha-olefin and from 0.5 to 25 parts, by weight, of cetyl benzene, the polymer containing residues of a group IV–VI metal.

2. The composition of claim 1 in which the polymer is polyethylene.

3. The composition of claim 1 in which the polymer is polypropylene.

References Cited in the file of this patent

UNITED STATES PATENTS 2,791,576    Field et al. _____ May 7, 1957

OTHER REFERENCES

Raff et al.: "Polyethylene," volume XI, Interscience Publishers Inc., New York, Nov. 9, 1956, page 333.